United States Patent
Hadianto et al.

(10) Patent No.: US 9,470,212 B2
(45) Date of Patent: Oct. 18, 2016

(54) POWER GENERATING SYSTEM INCLUDING A GAS/LIQUID SEPARATOR

(71) Applicant: Kabushiki Kaisha Toshiba, Minato-ku (JP)

(72) Inventors: Mohammad Ashari Hadianto, Yokohama (JP); Akihiro Taniguchi, Yokohama (JP); Mikhail Rodionov, Ebina (JP); Nobuo Okita, Yokohama (JP); Shoko Ito, Sagamihara (JP); Katsuya Yamashita, Setagaya-ku (JP); Osamu Furuya, Kawasaki (JP); Mikio Takayanagi, Suginami-ku (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 443 days.

(21) Appl. No.: 14/058,340

(22) Filed: Oct. 21, 2013

(65) Prior Publication Data

US 2014/0116046 A1    May 1, 2014

(30) Foreign Application Priority Data

Nov. 1, 2012   (JP) ................... 2012-241513

(51) Int. Cl.
*F03G 7/04*    (2006.01)
*F01K 23/02*    (2006.01)

(52) U.S. Cl.
CPC .................. *F03G 7/04* (2013.01); *F01K 23/02* (2013.01); *Y02E 10/10* (2013.01)

(58) Field of Classification Search
CPC ..................... Y02E 10/10–10/18; F03G 7/04; F24J 3/08–3/086; F24J 2003/087–2003/089; F01K 23/02; F01K 25/08; F01K 25/10; F01K 25/106

USPC ............................................. 60/641.2–641.6
See application file for complete search history.

(56) References Cited

U.S. PATENT DOCUMENTS

| 3,862,545 A | * | 1/1975 | Ellis | ........................ F03G 7/04 |
| | | | | 60/641.5 |
| 4,138,851 A | * | 2/1979 | Rogers | ..................... F01K 7/18 |
| | | | | 203/11 |

(Continued)

FOREIGN PATENT DOCUMENTS

| EP | 0 652 368 A1 | 5/1995 |
| JP | 62-43048 | 9/1987 |
| JP | 7-208117 | 8/1995 |

OTHER PUBLICATIONS

Search Report mailed Mar. 29, 2016; from Russian Patent Office in counterpart Turkish Patent Application No. 2013/12403.

*Primary Examiner* — Thomas Denion
*Assistant Examiner* — Laert Dounis
(74) *Attorney, Agent, or Firm* — Oblon, McClelland, Maier & Neustadt, L.L.P.

(57) ABSTRACT

A flasher separates a geothermal fluid into steam and hot water. A steam turbine is driven by being supplied with the separated steam as a working medium. An evaporator is supplied with the steam from the steam turbine as a first heating medium, which is thereafter supplied to a first preheater via the evaporator. A superheater is supplied with the hot water separated by the flasher as a second heating medium, which is thereafter supplied to a second preheater via the superheater. A medium turbine is driven by being supplied, as a working medium, with a low-boiling-point medium having been heat-exchanged sequentially in the first preheater, the second preheater, the evaporator, and the superheater. In the evaporator and the first preheater, the low-boiling-point medium and the first heating medium are heat-exchanged. In the superheater and the second preheater, the low-boiling-point medium and the second heating medium are heat-exchanged.

4 Claims, 3 Drawing Sheets

(56) References Cited

U.S. PATENT DOCUMENTS

| | | | |
|---|---|---|---|
| 5,440,882 A | 8/1995 | Kalina | |
| 5,671,601 A * | 9/1997 | Bronicki | F03G 7/04 60/641.2 |
| 5,809,782 A * | 9/1998 | Bronicki | F03G 7/04 60/641.2 |
| 5,822,990 A * | 10/1998 | Kalina | F01K 23/04 60/641.2 |
| 6,009,711 A * | 1/2000 | Kreiger | F03G 7/04 60/641.2 |
| 6,769,256 B1 * | 8/2004 | Kalina | F01K 25/065 60/641.2 |
| 2007/0095065 A1 | 5/2007 | Kaplan et al. | |

* cited by examiner

POWER GENERATING SYSTEM INCLUDING A GAS/LIQUID SEPARATOR

CROSS REFERENCE TO RELATED APPLICATION

This application is based upon and claims the benefit of priority from Japanese Patent Application No. 2012-241513 filed on Nov. 1, 2012; the entire contents of which are incorporated herein by reference.

FIELD

Embodiments described herein relate generally to a power generating system.

BACKGROUND

There has been known a combined power generating system in which steam separated from a geothermal fluid (geothermal water) is used as a working medium to drive a steam turbine, and a low-boiling-point medium which is gasified by using the steam discharged from the steam turbine and hot water separated from the geothermal fluid is used as a working medium to drive a medium turbine.

In the above-described power generating system, the steam discharged from the steam turbine and the hot water obtained by separating the steam from the geothermal fluid are joined with each other, and the resultant is used as a heating medium (heat source medium) to gasify the low-boiling-point medium, and the gasified low-boiling-point medium is supplied to the medium turbine.

However, the hot water obtained by separating the steam from the geothermal fluid and the steam discharged from the steam turbine differ in energy level. This sometimes does not allow the sufficient superheating of the low-boiling-point medium when the combination of the both and the low-boiling-point medium are heat-exchanged with each other.

As described above, in the power generating system that generates power by using the geothermal fluid, use efficiency of geothermal energy is not sufficient, and as a result, it is sometimes difficult to improve a power generation amount.

Hence, a problem to be solved by the present invention is to provide a power generating plant capable of improving use efficiency of geothermal energy and increasing a power generation amount.

DETAILED DESCRIPTION

Embodiments will be described with reference to the drawings.

First Embodiment

[A] Structure of Power Generating System

Figure 1:
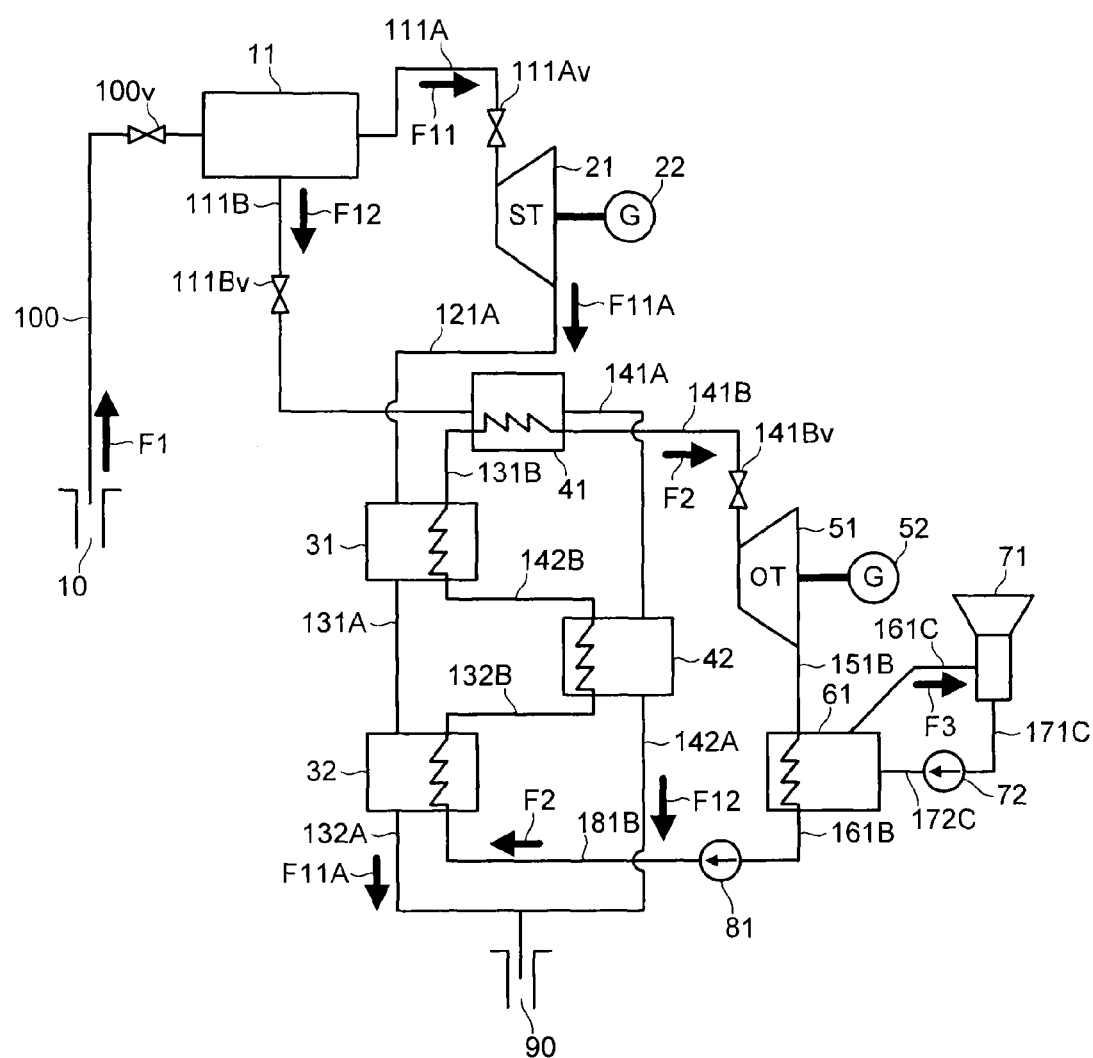
FIG. 1 is a system diagram illustrating a power generating system according to a first embodiment.

FIG. 1 is a system diagram illustrating a power generating system according to a first embodiment.

As illustrated in FIG. 1, the power generating system 1 has a flasher 11, a steam turbine 21, a power generator 22, an evaporator 31, a first preheater 32, a superheater 41, a second preheater 42, a medium turbine 51, a power generator 52, a condenser 61, a cooling tower 71, a cooling pump 72, and a medium pump 81.

Hereinafter, the structure of the units included in the power generating system 1 will be described in sequence.

[A-1] Flasher 11

The flasher 11 separates a geothermal fluid F1 (geothermal water) supplied from a production well 10 into steam and hot water to supply the separated steam as a working medium F11 to the steam turbine 21 and to supply the separated hot water as a heating medium F12 to the superheater 41.

Concretely, a pipe 100 in which a pressure reducing valve 100v is installed is provided between the flasher 11 and the production well 10, and the geothermal fluid F1 flows into the pipe 100 from the production well 10 to be supplied to the flasher 11 via the pressure reducing valve 100v. Then, the flasher 11 separates the supplied geothermal fluid F1 into the steam and the hot water by pressure-reducing the geothermal fluid F1.

Further, a pipe 111A in which a valve 111Av (main steam stop valve (MSV), steam control valve (CV)) is installed is provided between the flasher 11 and the steam turbine 21, and the flasher 11 supplies the separated steam as the working medium F11 to the steam turbine 21 through the pipe 111A. Further, a pipe 111B in which a pressure reducing valve 111Bv is installed is provided between the flasher 11 and the superheater 41, and the flasher 11 supplies the separated hot water as the heating medium F12 to the superheater 41 through the pipe 111B.

[A-2] Steam Turbine 21

The steam turbine 21 is driven by the working medium F11 supplied to the inside of the steam turbine 21 from the flasher 11.

Concretely, in the steam turbine 21, the working medium F11 is supplied to the inside of a casing (not shown) from the pipe 111A provided between the steam turbine 21 and the flasher 11, via the valve 111Av (MSV, CV). Then, in the steam turbine 21, a turbine rotor (not shown) rotates in the casing by the supply of the working medium F11.

Here, in the steam turbine 21, a plurality of turbine stages each including stationary blades (nozzles) and rotor blades (turbine blades) are provided along a rotating shaft of the turbine rotor, and the working medium F11 is supplied to the first turbine stage located at one end portion. Then, in the steam turbine 21, the supplied working medium F11 does work in each of the turbine stages to rotate the turbine rotor. The working medium F11 reduces in temperature and pressure as it flows from the one end portion towards the other end portion, and is discharged through a pipe 121A after passing through the final turbine stage located at the other end portion.

That is, the steam turbine 21 is a single-flow turbine in which the working medium F11 flows from the one end portion toward the other end portion to be discharged.

[A-3] Power Generator 22

The power generator 22 is coupled to the rotating shaft of the turbine rotor provided in the steam turbine 21 and is driven by the rotation of the turbine rotor to generate power.

[A-4] Evaporator 31

The evaporator 31 evaporates a low-boiling-point medium F2 preheated in the second preheater 42. Here, the steam used as the working medium F11 in the steam turbine 21 is discharged as a heating medium F11A (first heating medium), and the evaporator 31 evaporates the low-boiling-point medium F2 by using the heating medium F11A.

Concretely, the evaporator 31 is supplied with the heating medium F11A from the steam turbine 21 via the pipe 121A. Further, the evaporator 31 is supplied with the low-boiling-point medium F2 from the second preheater 42 via a pipe 142B. Then, in the evaporator 31, the heating medium F11A and the low-boiling-point medium F2 are heat-exchanged with each other, so that the low-boiling-point medium F2 evaporates.

Thereafter, in the evaporator 31, the heating medium F11A having undergone the heat exchange is discharged to a pipe 131A. Here, the heating medium F11A is condensed at an exit of the evaporator 31 and is discharged in a hot water state. Further, in the evaporator 31, the low-boiling-point medium F2 having undergone the heat exchange is discharged to a pipe 131B.

[A-5] First Preheater 32

The first preheater 32 preheats the low-boiling-point medium F2 condensed by the condenser 61, by using the heating medium F11A discharged from the evaporator 31.

Concretely, the first preheater 32 is supplied with the heating medium F11A from the evaporator 31 via the pipe 131A. Further, the first preheater 32 is supplied with the low-boiling-point medium F2 from the condenser 61 via a pipe 161B. Here, the heating medium F11A is condensed at the exit of the evaporator 31 and is supplied in the hot water state. The low-boiling-point medium F2 is condensed by the condenser 61 and is supplied in a liquefied state. Then, in the first preheater 32, the heating medium F11A and the low-boiling-point medium F2 are heat-exchanged with each other, so that the low-boiling-point medium F2 is preheated.

Thereafter, in the first preheater 32, the heating medium F11A is discharged to a pipe 132A and is returned to an injection well 90. Further, the low-boiling-point medium F2 is discharged from the first preheater 32 to a pipe 132B.

[A-6] Superheater 41

The superheater 41 is supplied with the hot water separated by the flasher 11, as the heating medium F12 (second heating medium), and superheats the low-boiling-point medium F2 evaporated by the evaporator 31, by using the supplied heating medium F12.

Concretely, the superheater 41 is supplied with the heating medium F12 from the flasher 11 via the pipe 111B. Further, the superheater 41 is supplied with the low-boiling-point medium F2 from the evaporator 31 via the pipe 131B. Here, the heating medium F12 is supplied to the superheater 41 while having a higher temperature than a temperature of the heating medium F11A discharged from the steam turbine 21, and the low-boiling-point medium F2 is supplied in a state of being vaporized by the evaporator 31. Then, in the superheater 41, the heating medium F12 and the low-boiling-point medium F2 are heat-exchanged with each other, so that the low-boiling-point medium F2 is superheated.

Thereafter, in the superheater 41, the heating medium F12 is discharged to a pipe 141A. Further, the low-boiling-point medium F2 is discharged from the superheater 41 to a pipe 141B.

[A-7] Second Preheater 42

The second preheater 42 further preheats the low-boiling-point medium F2 preheated by the first preheater 32, by using the heating medium F12 supplied from the superheater 41.

Concretely, the second preheater 42 is supplied with the heating medium F12 from the superheater 41 via the pipe 141A. Further, the second preheater 42 is supplied with the low-boiling-point medium F2 from the first preheater 32 via the pipe 132B. Then, in the second preheater 42, the heating medium F12 and the low-boiling-point medium F2 are heat-exchanged with each other, so that the low-boiling-point medium F2 is further preheated.

Thereafter, in the second preheater 42, the heating medium F12 is discharged to a pipe 142A and is returned to the injection well 90. Further, the low-boiling-point medium F2 is discharged from the second preheater 42 to the pipe 142B.

[A-8] Medium Turbine 51

The low-boiling-point medium F2 which has undergone the heat exchange in the first preheater 32, the second preheater 42, the evaporator 31, and the superheater 41 in sequence is supplied to the inside of the medium turbine 51, so that the medium turbine 51 drives the power generator 52.

Concretely, the low-boiling-point medium F2 is supplied as the working medium to the inside of a casing (not shown) of the medium turbine 51 from the pipe 141B provided between the medium turbine 51 and the superheater 41, via a pressure reducing valve 141Bv. In this embodiment, as the low-boiling-point medium F2, one lower in boiling point than water is used. For example, the low-boiling-point medium F2 is alternative chlorofluorocarbon such as hydrofluorocarbon (HFC) or hydrocarbon such as butane. Then, in the medium turbine 51, a turbine rotor (not shown) installed in its casing is rotated by the supply of the low-boiling-point medium F2.

Here, as in the steam turbine 21, in the medium turbine 51, a plurality of turbine stages each including stationary blades (nozzles) and rotary blades (turbine blades) are provided along a rotating shaft of the turbine rotor, and the low-boiling-point medium F2 is supplied to the first turbine stage located at one end portion. Then, in the medium turbine 51, the supplied low-boiling-point medium F2 does work in each of the turbine stages to rotate the turbine rotor. The low-boiling-point medium F2 reduces in pressure and temperature as it flows from the one end portion toward the other end portion, and is discharged as a discharge medium from a pipe 151B after passing through the final turbine stage located at the other end portion.

That is, the medium turbine 51 is a single-flow turbine similarly to the steam turbine 21.

[A-9] Power Generator 52

The power generator 52 is coupled to the rotating shaft of the medium turbine 51 and is driven by the rotation of the turbine rotor in the medium turbine 51, to generate power.

[A-10] Condenser 61

The condenser 61 condenses the low-boiling-point medium F2 discharged from the medium turbine 51.

Concretely, the condenser 61 is supplied with the low-boiling-point medium F2 from the medium turbine 51 via the pipe 151B. Further, the condenser 61 is supplied with a refrigerant F3 from the cooling pump 72 via a pipe 172C. Then, in the condenser 61, the low-boiling-point medium F2 discharged from the medium turbine 51 and the refrigerant F3 supplied from the cooling pump 72 are heat-exchanged with each other, so that the low-boiling-point medium F2 is condensed.

Thereafter, in the condenser 61, the condensed low-boiling-point medium F2 is discharge to the pipe 161B. Further, the refrigerant F3 is discharged from the condenser 61 to a pipe 161C.

[A-11] Cooling Tower 71

The cooling tower 71 cools the refrigerant F3 discharged from the condenser 61.

Concretely, the cooling tower 71 is supplied with the refrigerant F3 from the condenser 61 via the pipe 161C to cool the supplied refrigerant F3. Then, the cooling tower 71 discharges the cooled refrigerant F3 to a pipe 171C.

[A-12] Cooling Pump 72

The cooling pump 72 supplies the condenser 61 with the refrigerant F3 discharged from the cooling tower 71.

Concretely, the cooling pump 72 is supplied with the refrigerant F3 from the cooling tower 71 via the pipe 171C. Then, the cooling pump 72 discharges the supplied refrigerant F3 to the pipe 172C, thereby transferring and supplying it to the condenser 61.

[A-13] Medium Pump 81

The medium pump 81 supplies the low-boiling-point medium F2 condensed by the condenser 61 to the medium turbine 51 via the first preheater 32, the second preheater 42, the evaporator 31, and the superheater 41 in sequence.

Concretely, the medium pump 81 is supplied with the low-boiling-point medium F2 condensed by the condenser 61, via the pipe 161B. Then, the medium pump 81 increases a pressure of the supplied low-boiling-point medium F2 to discharge it to a pipe 181B. Consequently, the medium pump 81 transfers the low-boiling-point medium F2 sequentially to the first preheater 32, the second preheater 42, the evaporator 31, and the superheater 41, and supplies the low-boiling-point medium F2 to the medium turbine 51 after the low-boiling-point medium F2 undergoes the heat exchange there.

[B] Operation in Power Generating System

The operation of the above-described power generating system 1 will be described with reference to FIG. 1.

As illustrated in FIG. 1, in the power generating system 1, after the flasher 11 separates the geothermal fluid F1 into the steam and the hot water, the steam turbine 21 is driven with the steam separated by the flasher 11 being used as the working medium F11.

Along with the above, the power generating system 1 gasifies the low-boiling-point medium F2 by using the steam discharged from the steam turbine 21 and the hot water separated by the flasher 11 as the heating mediums F11A, F12. Thereafter, in the power generating system 1, the medium turbine 51 is driven by using the gasified low-boiling-point medium F2 as the working medium.

Hereinafter, regarding the above-described operation, the flow of the geothermal fluid F1 and the flow of the low-boiling-point medium F2 will be separately described in detail.

[B-1] Regarding Flow of Geothermal Fluid F1

The geothermal fluid F1 is used in a flash cycle which circulates around the production well 10, the flasher 11, the steam turbine 21, the evaporator 31, the first preheater 32, the superheater 41, the second preheater 42, and the injection well 90 in sequence, as illustrated in FIG. 1.

Concretely, the geothermal fluid F1 (geothermal water) is first supplied from the production well 10 to the flasher 11. The geothermal fluid F1 is a mixed fluid in which steam and hot water are mixed, and it is reduced in pressure in the flasher 11 to be separated into the steam and the hot water.

Then, the steam separated in the flasher 11 is supplied as the working medium F11 to the steam turbine 21. For example, the working medium F11 is supplied to the steam turbine 21 while having a temperature of 150° C. Then, the working medium F11 does work in the steam turbine 21 to drive the power generator 22.

Thereafter, the working fluid F11 is discharged from the steam turbine 21 and is supplied as the heating medium F11A (first heating medium) sequentially to the evaporator 31 and the first preheater 32. For example, after being supplied from the steam turbine 21 to the evaporator 31 while having a temperature of 100° C., the heating medium F11A is supplied to the first preheater 32 in a state of being condensed in the evaporator 31. Then, the heating medium F11A is returned from the first preheater 32 to the injection well 90. For example, the heating medium F11A is discharged to the injection well 90 while having a temperature of 80° C.

Meanwhile, the hot water separated in the flasher 11 is supplied as the heating medium F12 (second heating medium) sequentially to the superheater 41 and the second preheater 42. The heating medium F12 (second heating medium) is supplied to the superheater 41 while having a higher temperature than a temperature of the heating medium F11A (first heating medium) supplied to the evaporator 31. Further, the heating medium F12 (second heating medium) is supplied from the superheater 41 to the second preheater 42 while having a higher temperature than a temperature of the heating medium F11A (first heating medium) supplied from the evaporator 31 to the first preheater 32. For example, the heating medium F12 is supplied to the second preheater 42 after being supplied to the superheater 41 while having a temperature of 150° C. Thereafter, the heating medium F12 is returned from the second preheater 42 to the injection well 90. For example, the heating medium F12 is discharged to the injection well 90 while having a temperature of 80° C.

As described above, the geothermal fluid F1 is circulated in the flash cycle. It should be note that the temperature conditions and so on of the fluids flowing in the flash cycle as described above are examples and are not limited to the above-described conditions.

[B-2] Regarding Flow of Low-Boiling-Point Medium F2

The low-boiling-point medium F2 is used in a binary cycle which circulates around the first preheater 32, the second preheater 42, the evaporator 31, the superheater 41, the medium turbine 51, the condenser 61, and the medium pump 81 in sequence, as illustrated in FIG. 1.

Concretely, the low-boiling-point medium F2 first undergoes the heat exchange in a heat-exchange unit composed of the first preheater 32, the second preheater 42, the evaporator 31, and the superheater 41. Here, the low-boiling-point medium F2 is preheated in the first preheater 32 by heat of the heating medium F11A (first heating medium) discharged from the evaporator 31. Then, the low-boiling-point medium F2 preheated by the first preheater 32 is further preheated in the second preheater 42 by heat of the heating medium F12 (second heating medium) discharged from the superheater 41. Then, the low-boiling-point medium F2 preheated by the first preheater 32 and the second preheater 42 evaporates in the evaporator 31 due to the heat of the heating medium 11A (first heating medium) discharged from the steam turbine 21. Thereafter, the low-boiling-point medium F2 evaporated by the evaporator 31 is superheated in the second preheater 42 by the heat of the heating medium F12 (second heating medium) discharged from the superheater 41.

The low-boiling-point medium F2 increases in temperature as it undergoes the heat exchange in the first preheater 32, the second preheater 42, the evaporator 31, and the superheater 41, and for example, its temperature becomes 70° C. in the first preheater 32, 80° C. in the second preheater 42, 110° C. in the evaporator 31, and 145° C. in the superheater 41.

Next, the low-boiling-point medium F2 superheated in the superheater 41 is supplied as the working medium into the medium turbine 51 and does work in the medium turbine 51 to drive the power generator 52.

Next, the low-boiling-point medium F2 discharged from the medium turbine 51 is condensed in the condenser 61. Then, the low-boiling-point medium F2 condensed by the condenser 61 is supplied to the medium turbine 51 by the medium pump 81 via the first preheater 32, the second preheater 42, the evaporator 31, and the superheater 41 in sequence, as described above.

As described above, the low-boiling-point medium F2 is circulated in the binary cycle. It should be noted that the temperature conditions and so on of the fluid flowing in the binary cycle as described above are examples and are not limited to the above-described conditions. Further, for the heat exchange of the low-boiling-point medium F2, heat exchange units disposed in parallel may be used.

[C] Summary

As described above, in the power generating system 1 of this embodiment, the steam discharged from the steam turbine 21 and the hot water separated in the flasher 11 both are not supplied in a joined state to the heat exchangers such as the evaporator 31. In this embodiment, after the steam separated in the flasher 11 is supplied as the working medium F11 to the steam turbine 21, the steam is supplied as the heating medium F11A (first heating medium) sequentially to the evaporator 31 and the first preheater 32. Then, the hot water separated in the flasher 11 flows in a different flow path from that of the steam separated in the flasher 11 and is supplied as the heating medium F12 (second heating medium) sequentially to the superheater 41 and the second preheater 42. Then, the low-boiling-point medium F2 is supplied as the working medium to the medium turbine 51 after undergoing the heat exchange in the first preheater 32, the second preheater 42, the evaporator 31, and the superheater 41 in sequence.

That is, in the superheater 41, the hot water separated in the flasher 11 is supplied while having a higher temperature than the temperature of the steam discharged from the steam turbine 21, and the low-boiling-point medium F2 is supplied from the evaporator 31, and the hot water and the low-boiling-point medium F2 are heat-exchanged with each other. Then, further, in the second preheater 42, the hot water discharged from the superheater 41 and the low-boiling-point medium F2 discharged from the first preheater 32 are heat-exchanged with each other.

Therefore, in this embodiment, in each of the first preheater 32, the second preheater 42, the evaporator 31, and the superheater 41, by an efficient increase of the temperature of the low-boiling-point medium F2, it is possible to gasify the low-boiling-point medium F2. As a result, in this embodiment, it is possible to increase a power generation amount in the binary cycle.

Hence, the power generating system 1 of this embodiment is capable of improving use efficiency of geothermal energy and is capable of realizing an increase in the power generation amount.

Second Embodiment

[A] Structure Etc.

Figure 2:
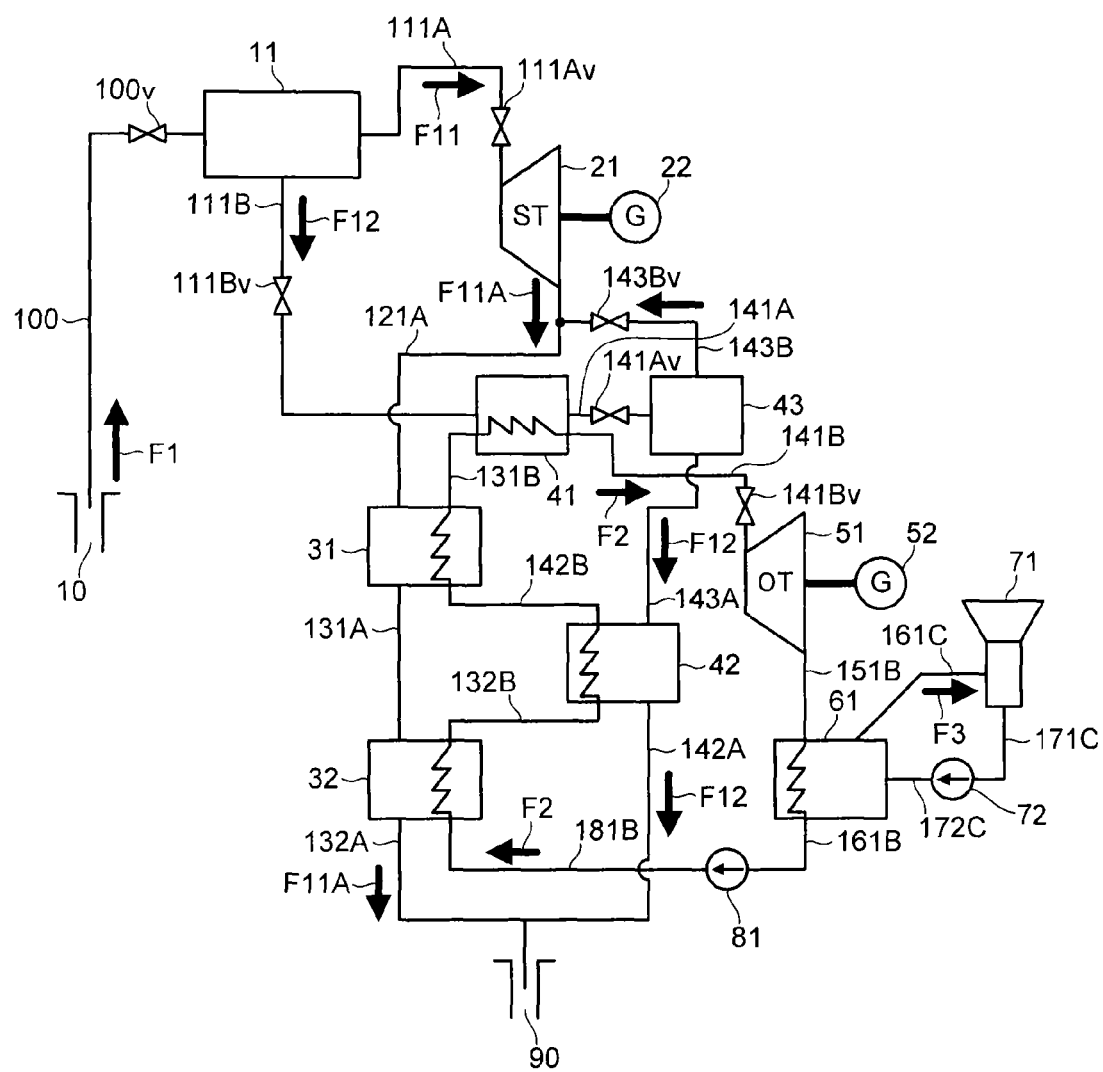
FIG. 2 is a system diagram illustrating a power generating system according to a second embodiment.

FIG. 2 is a system diagram illustrating a power generating system according to a second embodiment.

As illustrated in FIG. 2, the power generating system 1b of this embodiment further includes a gas/liquid separator 43. This embodiment is the same as the first embodiment except for this point and except for points relating to this. Therefore, in this embodiment, description of what are the same as those of the above-described embodiment will be omitted, when appropriate.

As illustrated in FIG. 2, the gas/liquid separator 43 is supplied with hot water separated by a flasher 11 from a superheater 41 via a pipe 141A in which a pressure reducing valve 141Av is installed. Then, the gas/liquid separator 43 pressure-reduces the hot water supplied from the superheater 41 to separate steam from the hot water.

Then, the gas/liquid separator 43 discharges the separated steam to a pipe 143B in which a pressure reducing valve 143Bv is installed. The pipe 143B is connected to a pipe 121A provided between a steam turbine 21 and an evaporator 31. Therefore, as a heating medium F11A (first heating medium), the steam separated from the hot water in the gas/liquid separator 43 is supplied together with the steam discharged from the steam turbine 21, to the evaporator 31 and a first preheater 32 in sequence.

Further, a pipe 143A is provided between the gas/liquid separator 43 and a second preheater 42, and the gas/liquid separator 43 discharges the hot water from which the steam is separated, to the pipe 143A. Therefore, the hot water from which the steam is separated in the gas/liquid separator 43 is supplied as a heating medium F12 (second heating medium) to the second preheater 42.

[B] Summary

As described above, in the power generating system 1b of this embodiment, as the heating medium F11A (first heating medium), the steam separated from the hot water in the gas/liquid separator 43 is supplied together with the steam discharged from the steam turbine 21, to the evaporator 31 and the first preheater 32 in sequence. Therefore, in this embodiment, a heat quantity of a low-boiling-point medium F2 heat-exchanged in the first preheater 32 is larger and its heat quantity heat-exchanged in the evaporator 31 is larger than those of the first embodiment. As a result, in this embodiment, it is possible to increase an evaporation amount of the low-boiling-point medium F2, which enables an increase in a power generation amount in a binary cycle.

Hence, the power generating system 1b of this embodiment is capable of further improving use efficiency of geothermal energy and is capable of realizing an increase in a power generation amount.

Third Embodiment

[A] Structure Etc.

Figure 3:
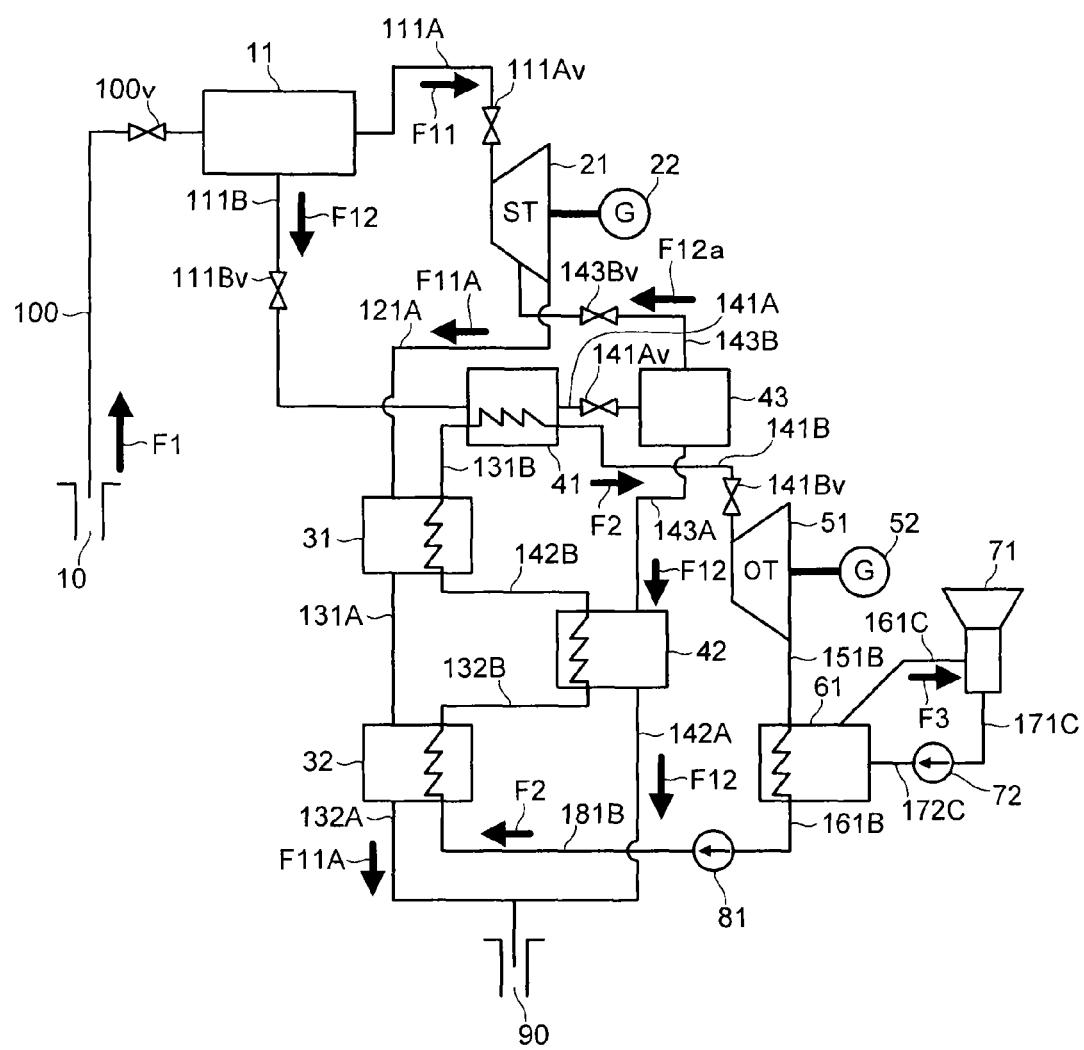
FIG. 3 is a system diagram illustrating a power generating system according to a third embodiment.

FIG. 3 is a system diagram illustrating a power generating system according to a third embodiment.

As illustrated in FIG. 3, the power generating system 1c of this embodiment is different from that of the second embodiment in a discharge destination of steam separated by a gas/liquid separator 43. This embodiment is the same as the second embodiment except for this point and points relating to this. Therefore, in this embodiment, description of what are the same as those of the above-described embodiment will be omitted, when appropriate.

The gas/liquid separator 43 is provided with a pipe 143B in which a pressure reducing valve 143Bv is installed as illustrated in FIG. 3. The pipe 143B is connected to a steam turbine 21, and the gas/liquid separator 43 supplies the steam separated from hot water as a working medium F12a to the steam turbine 21 via the pipe 143B. Here, the gas/liquid separator 43 supplies the steam separated from the hot water, as the working medium F12a to a middle turbine stage located more on a downstream side than a first turbine stage.

As described above, in the steam turbine 21, as in the other embodiments, the steam separated by a flasher 11 is supplied as a working medium F11 to the first turbine stage. Besides, unlike the other embodiments, the steam separated from the hot water in the gas/liquid separator 43 is supplied as the working medium F12a to the middle turbine stage in the steam turbine 21, as described above. That is, the steam turbine 21 is a mixed-pressure turbine.

[B] Summary

As described above, in the power generating system 1c of this embodiment, the steam separated from the hot water in the gas/liquid separator 43 is supplied as the working medium F12a to the turbine stage located on the middle stage in the steam turbine 21, unlike the case of the second embodiment. Therefore, in this embodiment, it is possible to increase a power generation amount in a flash cycle.

Besides, the steam separated from the hot water in the gas/liquid separator 43 is mixed, in the steam turbine 21, with the steam separated by the flasher 11, and is thereafter supplied as the heating medium 11A (first heating medium) from the steam turbine 21 to an evaporator 31 and a first preheater 32 in sequence. Therefore, in this embodiment, a heat quantity of a low-boiling-point medium F2 heat-exchanged in the first preheater 32 is larger and its heat quantity heat-exchanged in the evaporator 31 is larger than those of the first embodiment. As a result, in this embodiment, since an evaporation amount of the low-boiling-point medium F2 can be increased than that of the first embodiment, it is possible to increase a power generation amount in a binary cycle.

Hence, the power generating system 1c of this embodiment is capable of further improving use efficiency of geothermal energy and is capable of realizing an increase in a power generation amount.

OTHERS

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power generating system, comprising:
a flasher separating a geothermal fluid supplied from a production well into steam and hot water;
a steam turbine driven by being supplied with the steam separated by the flasher as a working medium;
an evaporator supplied with the steam discharged from the steam turbine as a first heating medium;
a first preheater supplied with the first heating medium via the evaporator;
a superheater supplied with the hot water separated by the flasher as a second heating medium from the flasher;
a second preheater supplied with the second heating medium via the superheater;
a medium turbine driven by being supplied with a low-boiling-point medium lower in boiling point than water as a working medium after the low-boiling-point medium is heat-exchanged in the first preheater, the second preheater, the evaporator, and the superheater in sequence; and
a gas/liquid separator supplied with the hot water separated by the flasher, via the superheater and separating the supplied hot water into steam and hot water by pressure-reducing the supplied hot water;
wherein, in the evaporator and the first preheater, the low-boiling-point medium and the first heating medium are heat-exchanged with each other;
wherein, in the superheater and the second preheater, the low-boiling-point medium and the second heating medium are heat-exchanged with each other;
wherein the hot water from which the steam is separated in the gas/liquid separator is supplied as the second heating medium to the second preheater; and
wherein, as the first heating medium, the steam separated from the hot water in the gas/liquid separator is supplied together with the steam discharged from the steam turbine, to the evaporator and the second preheater in sequence.

2. A power generating system, comprising:
a flasher separating a geothermal fluid supplied from a production well into steam and hot water;
a steam turbine driven by being supplied with the steam separated by the flasher as a working medium;
an evaporator supplied with the steam discharged from the steam turbine as a first heating medium;
a first preheater supplied with the first heating medium via the evaporator;
a superheater supplied with the hot water separated by the flasher as a second heating medium from the flasher;
a second preheater supplied with the second heating medium via the superheater;
a medium turbine driven by being supplied with a low-boiling-point medium lower in boiling point than water as a working medium after the low-boiling-point medium is heat-exchanged in the first preheater, the second preheater, the evaporator, and the superheater in sequence; and
a gas/liquid separator supplied with the hot water separated by the flasher, via the superheater and separating the supplied hot water into steam and hot water by pressure-reducing the supplied hot water;
wherein, in the evaporator and the first preheater, the low-boiling-point medium and the first heating medium are heat-exchanged with each other;
wherein, in the superheater and the second preheater, the low-boiling-point medium and the second heating medium are heat-exchanged with each other;
wherein the hot water from which the steam is separated in the gas/liquid separator is supplied as the second heating medium to the second preheater; and
wherein the steam separated from the hot water in the gas/liquid separator is supplied as a working medium to a turbine stage which is located more on a downstream side than a first turbine stage to which the steam separated by the flasher is supplied as the working medium, in the steam turbine.

3. The power generating system according to claim 1, further comprising:
- a condenser condensing the low-boiling-point medium discharged from the medium turbine; and
- a medium pump supplying the low-boiling-point medium condensed by the condenser, to the medium turbine via the first preheater, the second preheater, the evaporator, and the superheater in sequence.

4. The power generating system according to claim 2, further comprising:
- a condenser condensing the low-boiling-point medium discharged from the medium turbine; and
- a medium pump supplying the low-boiling-point medium condensed by the condenser, to the medium turbine via the first preheater, the second preheater, the evaporator, and the superheater in sequence.

* * * * *